T. McLaughlin,
Nipple Shield.
N° 77,393. Patented Apr. 28, 1868.
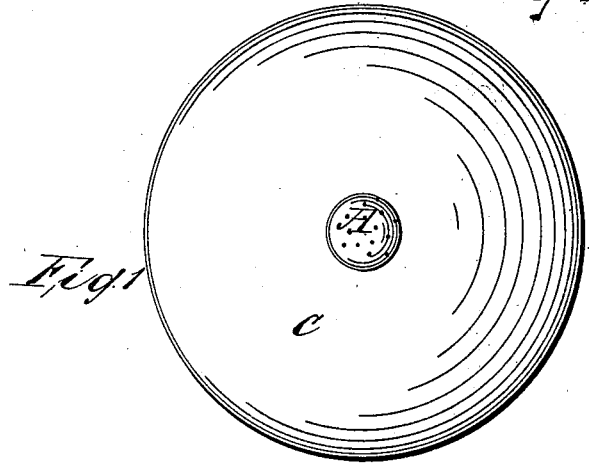
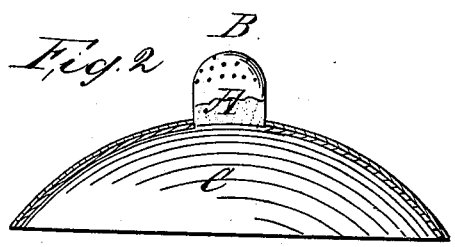
Witnesses
Edmund S. Hann
Jonathan B. Evans
Inventor
Thomas McLaughlin

United States Patent Office.

THOMAS McLAUGHLIN, OF MILLVILLE, NEW JERSEY.

Letters Patent No. 77,393, dated April 28, 1868.

SHIELD FOR NIPPLES.

The Schedule referred to in these Letters Patent and making part of the same.

TO ALL WHOM IT MAY CONCERN:

Be it known that I, THOMAS McLAUGHLIN, of Millville, in the county of Cumberland, in the State of New Jersey, have invented a new and useful Shield for the Nipple, which obviates the soreness caused by the poison from the child's mouth; and I do hereby declare that the following is a full and exact description of the construction of the same, reference being had to the annexed drawings, making a part of this specification, in which—

Figure 1 is the front view.

Figure 2, side view.

A is a thin, skin-like substance, made of India rubber or any other suitable material, fitting close to the nipple, having a few small holes in the end, B. C is a cap, made of horn or any other suitable material, fitting over the breast, and around the nipple, to hold A to its place.

What I claim is—

The shield or covering A, with the small holes B, in combination with the cap C, constructed and arranged as and for the purpose set forth.

THOMAS McLAUGHLIN.

Witnesses:
JONATHAN B. EVANS,
EDMUND S. HANN.